(12) United States Patent
Kim

(10) Patent No.: US 9,123,472 B2
(45) Date of Patent: *Sep. 1, 2015

(54) HIGH CAPACITY MULTILAYER CERAMIC CAPACITOR AND METHOD OF MANUFACTURING THE SAME

(75) Inventor: Hyung Joon Kim, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 224 days.

This patent is subject to a terminal disclaimer.

(21) Appl. No.: 13/233,549

(22) Filed: Sep. 15, 2011

(65) Prior Publication Data

US 2012/0229949 A1  Sep. 13, 2012

(30) Foreign Application Priority Data

Mar. 9, 2011  (KR) ........................ 10-2011-0021077

(51) Int. Cl.
*H01G 4/12* (2006.01)
*H01G 4/005* (2006.01)

(52) U.S. Cl.
CPC ................. *H01G 4/12* (2013.01); *H01G 4/005* (2013.01); *Y10T 29/43* (2015.01)

(58) Field of Classification Search
CPC ............ H01G 4/005; H01G 4/12; H01G 4/30
USPC ............................................ 361/321.2, 306.3
See application file for complete search history.

(56) References Cited

U.S. PATENT DOCUMENTS

| | | | | |
|---|---|---|---|---|
| 4,771,520 A | * | 9/1988 | Tanaka et al. | 29/25.42 |
| 7,644,480 B2 | * | 1/2010 | Kim et al. | 29/25.42 |
| 7,859,823 B2 | * | 12/2010 | Suzuki | 361/321.1 |
| 8,411,409 B2 | * | 4/2013 | Ogawa et al. | 361/301.4 |
| 8,824,119 B2 | * | 9/2014 | Kim et al. | 361/321.2 |

(Continued)

FOREIGN PATENT DOCUMENTS

| JP | 61-248413 U | | 11/1986 |
|---|---|---|---|
| JP | 03108306 A | * | 5/1991 |

(Continued)

OTHER PUBLICATIONS

Korean Office Action, and English translation thereof, issued in Korean Patent Application No. 10-2012-0048492 dated Aug. 8, 2012.

(Continued)

*Primary Examiner* — David M Sinclair
(74) *Attorney, Agent, or Firm* — McDermott Will & Emery LLP

(57) ABSTRACT

There is disclosed a multilayer ceramic capacitor and a method of manufacturing the same. The multilayer ceramic capacitor includes a multilayer body having a first side and a second side opposite to each other and having a third side and a fourth side connecting the first side to the second side, a plurality of inner electrodes formed in the multilayer body and having distal edges exposed to the first side or the second side, first and second side members formed on the first and second sides to cover the distal edges of the plurality of inner electrodes, and outer electrodes formed on the third side and the fourth side to be electrically connected to the inner electrodes. An angle between a virtual line connecting the distal edges of the plurality of inner electrodes and the first side member or the second side member is less than 90° ($\pi/2$).

21 Claims, 8 Drawing Sheets

(56) References Cited

U.S. PATENT DOCUMENTS

| | | |
|---|---|---|
| 2007/0202036 A1* | 8/2007 | Jongen et al. ............... 423/593.1 |
| 2008/0304204 A1 | 12/2008 | Suzuki |
| 2010/0085682 A1* | 4/2010 | Abe et al. ..................... 361/303 |

FOREIGN PATENT DOCUMENTS

| | | | |
|---|---|---|---|
| JP | 06-349669 A | | 12/1994 |
| JP | 09-260206 | | 10/1997 |
| JP | 2001-284157 | | 10/2001 |
| JP | 2005-136132 | | 5/2005 |
| JP | 2005259772 A | * | 9/2005 |
| JP | 2009176771 A | * | 8/2009 |
| JP | 2010-092896 A | | 4/2010 |
| JP | 2010093038 A | * | 4/2010 |
| JP | 2010-103566 A | | 5/2010 |
| JP | 2011-003846 | | 1/2011 |

OTHER PUBLICATIONS

Korean Office Action, and English translation thereof, issued in Korean Patent Application No. 10-2011-0021077 dated Mar. 8, 2012.

Japanese Office Action issued in Japanese Application No. 2011-206873 dated Jun. 4, 2013 with English Translation.

Japanese Office Action, w/ English translation thereof, issued in Japanese Patent Application No. JP 2011-206873 dated Oct. 22, 2013.

English translation of JP 2009-176771 retrieved from http://www.ipdl.inpit.go.jp.

Chinese Office Action issued in corresponding Chinese Application No. 201110303300.3, dated Apr. 3, 2014, with English translation.

* cited by examiner

A-A'

B-B'

HIGH CAPACITY MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2011-0021077 filed on Mar. 9, 2011, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a high-capacity multilayer ceramic capacitor having excellent reliability and a method of manufacturing the same.

2. Description of the Related Art

Generally, electronic components using a ceramic material such as a capacitor, an inductor, a piezoelectric element, a varistor, a thermistor, or the like, include a ceramic body made of a ceramic material, inner electrodes formed within the ceramic body, and outer electrodes mounted on surfaces of the ceramic body so as to be connected to the inner electrodes.

The multilayer ceramic capacitor, among ceramic electronic components, is configured to include a plurality of stacked dielectric layers, inner electrodes disposed to be opposed to each other, having each dielectric layer therebetween, and outer electrodes electrically connected to the inner electrodes.

The multilayer ceramic capacitor has been widely used as a component of a mobile communication apparatus such as a computer, a PDA, a mobile phone, or the like, due to advantages such as miniaturization, high capacity, ease of mounting, and the like.

Recently, as electronic products have become miniaturized and multi-functional, chip parts have also tended to be miniaturized and multi-functional. As a result, there is a need to miniaturize the multilayer ceramic capacitor while increasing the capacity thereof.

Generally, the multilayer ceramic capacitor may be manufactured as follows. First, an inner electrode is formed by manufacturing a ceramic green sheet and printing a conductive paste on the ceramic green sheet. A green ceramic laminate is manufactured by multilayering the ceramic green sheets, on which the inner electrodes are formed, from several layers to several hundred layers. Thereafter, the solid green ceramic laminate is manufactured by compressing the green ceramic laminate at high temperature and high pressure and the solid green ceramic laminate is subjected to a cutting process to manufacture green chips. Thereafter, the multilayer ceramic capacitor is completed by plasticizing and firing the green chip and then, forming the outer electrodes thereon.

When the multilayer ceramic capacitor is formed by the above-mentioned manufacturing method, margin portions at edges of the multilayer ceramic capacitor are formed to be thicker than margin portions of other areas, such that it may be difficult to remove carbon during plasticizing and firing processes. Further, in order to easily form the outer electrodes, a polishing process to polish the shape of a plasticized chip should be performed. Therefore, chips may be broken during the polishing process.

SUMMARY OF THE INVENTION

An object of the present invention provides a high-capacity multilayer ceramic capacitor having excellent reliability and a method of manufacturing the same.

According to an exemplary embodiment of the present invention, there is provided a multilayer ceramic capacitor, including: a multilayer body having a first side and a second side opposite to each other and having a third side and a fourth side connecting the first side to the second side; a plurality of inner electrodes formed in the multilayer body and having distal edges exposed to the first side or the second side; first and second side members formed on the first and second sides to cover the distal edges of the plurality of inner electrodes; and outer electrodes formed on the third side and the fourth side to be electrically connected to the inner electrodes. An angle between a virtual line connecting the distal edges of the plurality of inner electrodes and the first side member or the second side member is less than 90° ($\pi/2$).

The angle formed by the virtual line connecting the distal edges of the plurality of inner electrodes and the first side member or the second side member may be 5° to 85°.

The first and second side members may be formed on the entirety of the first side or the second side.

The distal edges of the first and second side member may meet edges at which a top surface or a bottom surface of the multilayer body meets the first side or the second side thereof.

The first and second side members may be formed on a partial area of the first side or the second side.

The distal edges of the first and second side members may be provided between edges at which a top surface or a bottom surface of the multilayer body meets the first side or the second side and distal edges of an outermost inner electrodes among the plurality of inner electrodes.

The first and second side members may be formed to partially extend from the first and second sides to the top surface or the bottom surface of the multilayer body.

The maximum thickness of the first and second side members may be 30 μm or less.

The first and second side members may be formed to have a curvature radius.

The multilayer body may be formed by stacking a plurality of dielectric layers having a width forming a distance between the first and second sides, and the inner electrodes have a width the same as the width of the dielectric layer.

The first and second side members may be made of ceramic slurry.

The inner electrodes may be configured to include a first inner electrode of which one end is exposed to the third side and the other end is formed to be spaced apart from the fourth side by a predetermined distance and a second inner electrode of which one end is exposed to the fourth side and the other end is formed to be spaced apart from the third side by a predetermined distance.

According to another exemplary embodiment of the present invention, there is provided a multilayer ceramic capacitor, including a multilayer body, first and second side members, and outer electrodes. The multilayer body includes a plurality of inner electrodes. The multilayer body has a first side and a second side opposite to each other and has a third side and a fourth side connecting the first side to the second side. The first and second side members are formed on the first and second sides of the multilayer body. The first and second side members have round edges. The first and second side members are in contact with distal edges of the inner electrodes. The outer electrodes are formed on the third side and the fourth side to be electrically connected to the inner electrodes.

According to another exemplary embodiment of the present invention, there is provided a method of manufacturing a multilayer ceramic capacitor, including: preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance; forming a ceramic green sheet laminate by alternately stacking the first ceramic green sheet and the second ceramic green sheet in such a manner that a central portion of each of the stripe-type first inner electrode patterns and a predetermined distance between the stripe-type second inner electrode patterns overlap with each other; cutting a ceramic green sheet laminate to traverse the stripe-type first inner electrode patterns and second inner electrode patterns, to allow first inner electrodes and second inner electrodes to have a predetermined width, and to allow the ceramic green sheet laminate to have sides to which distal edges of the first inner electrodes and the second inner electrodes are exposed in a width direction thereof; and forming a first side member and a second side member made of ceramic slurry on the sides to which the distal edges of the first and second inner electrodes are exposed, in order that an angle formed by a virtual line connecting the distal edges of the first inner electrodes and the second inner electrodes is set to be less than 90π (π/2).

The cutting of the ceramic green sheet laminate may include cutting the ceramic green sheet laminate into bar-type laminates, each bar-type laminate having sides to which the distal edges of the first inner electrodes and the second inner electrodes are exposed; and after the forming of the first and second side members, cutting the ceramic green sheet into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line.

The cutting of the ceramic green sheet laminate may performed by cutting the ceramic green sheet into bar-type laminates, each bar-type laminate having sides to which the distal edges of the first inner electrodes and the second inner electrodes are exposed, and cutting the bar-type laminate into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line; and the forming of the first and second side members is performed on the multilayer body.

The first and second side members may be formed on the entirety of the sides to which the distal edges of the first and second inner electrodes are exposed.

The first and second side members may be formed on a partial area of the sides to which the distal edges of the first and second inner electrodes are exposed.

The first and second side members may be formed to partially extend from the sides to which the distal edges of the first and second inner electrodes are exposed, to a top surface or a bottom surface of the ceramic green sheet laminate.

The first and second side members may be formed to have a curvature radius.

The forming of the first side member and the second side member may be performed by applying ceramic slurry to the sides to which the distal edges of the first inner electrodes and the second inner electrodes are exposed.

forming of the first side member and the second side member may be performed by dipping the sides to which the distal edges of the first inner electrodes and the second inner electrodes are exposed in the ceramic slurry.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
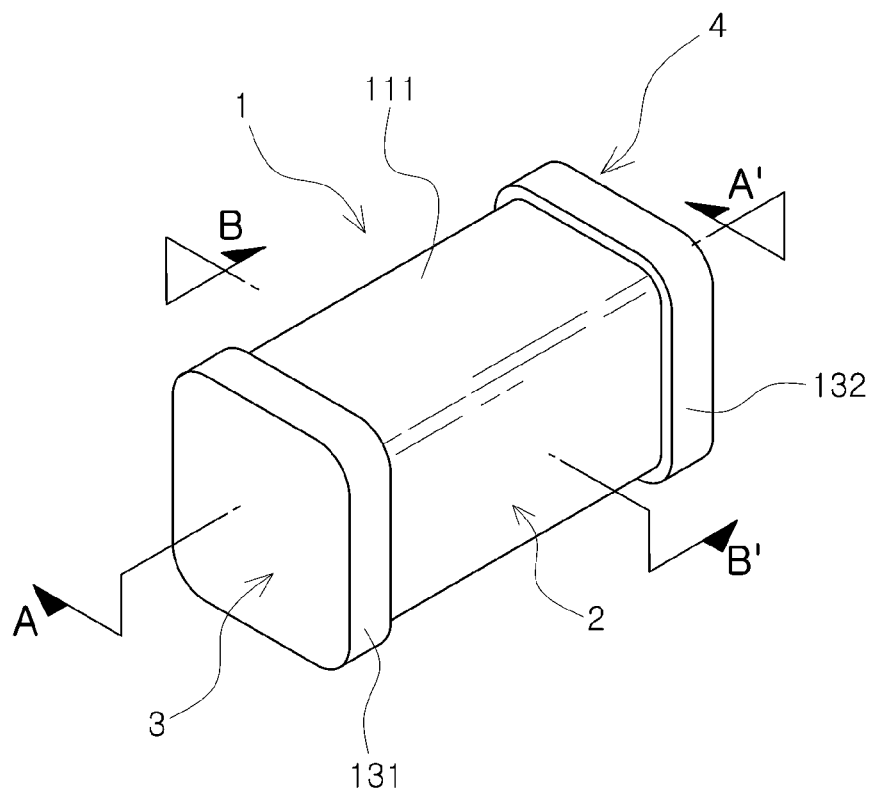
FIG. 1A is a schematic perspective view of a multilayer ceramic capacitor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of components are exaggerated for clarity. The same or equivalent elements are referred to by the same reference numerals throughout the specification.

Figure 1B:
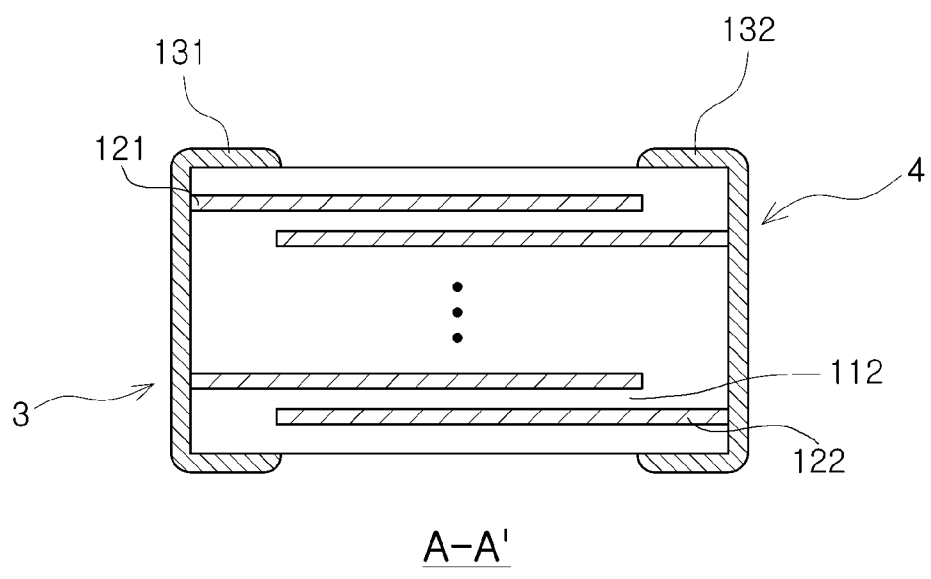
FIG. 1B is a cross-sectional view of the multilayer ceramic capacitor taken along line A-A' of FIG. 1A.
Figure 1C:
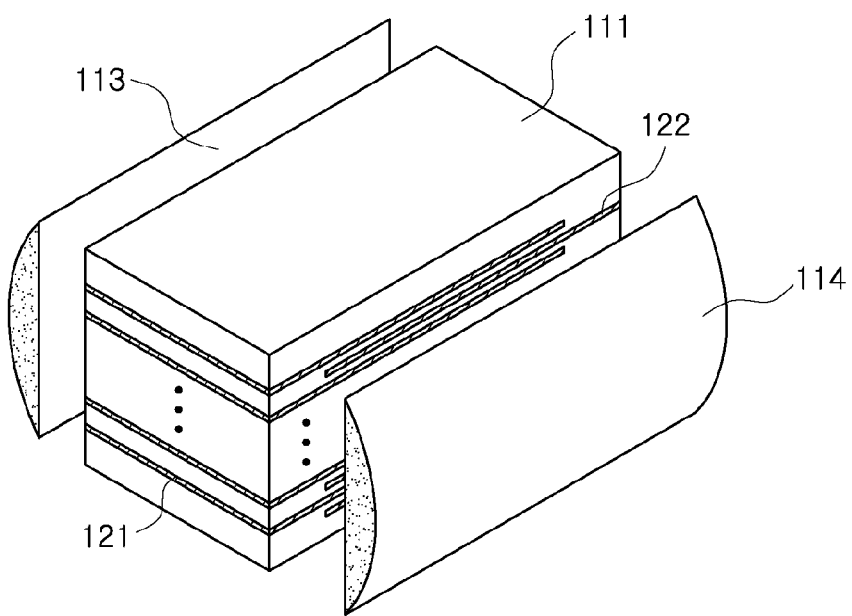
FIG. 1C is an exploded perspective view of a multilayer body and first and second side members.
Figure 1D:
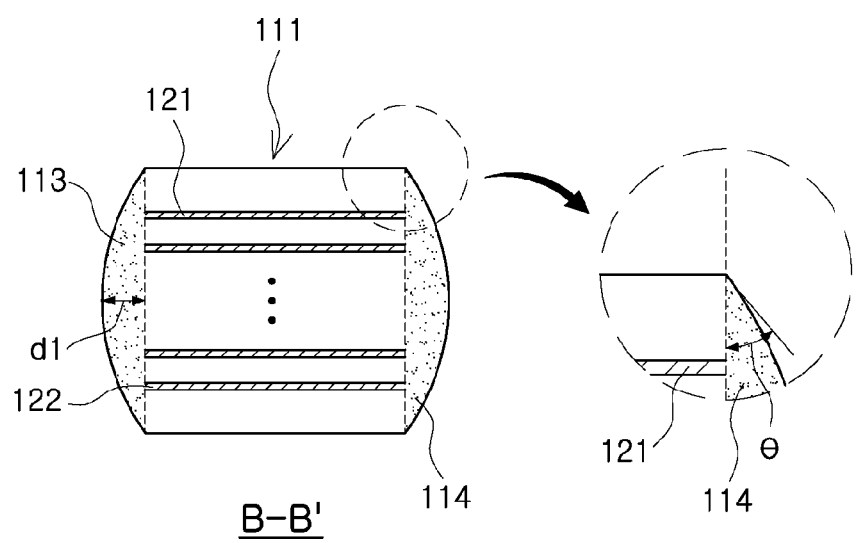
FIG. 1D is a cross-sectional view of the multilayer ceramic capacitor taken along line B-B' of FIG. 1A.
Figure 1E:
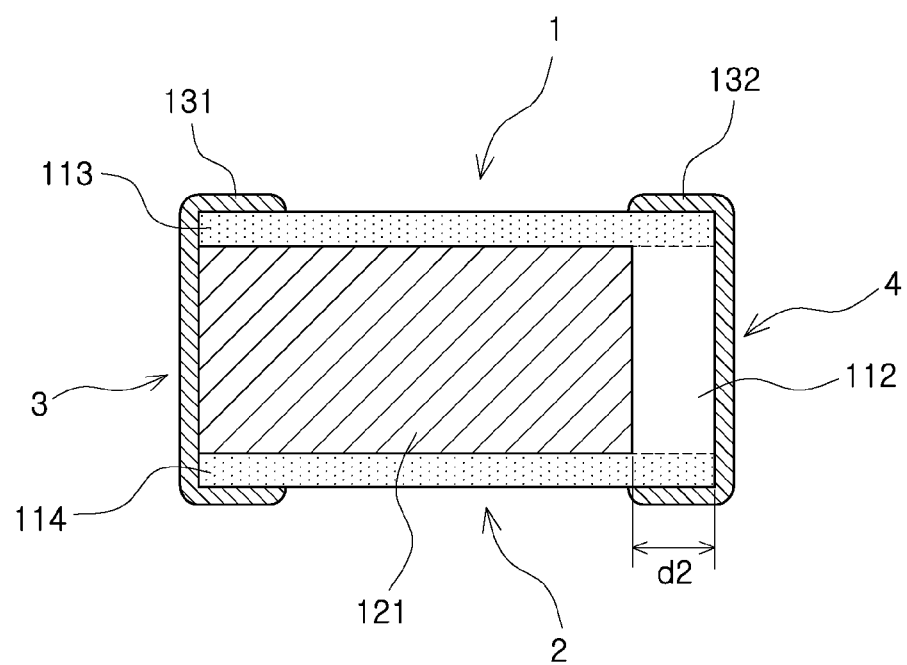
FIG. 1E is a top plan view of the multilayer ceramic capacitor showing one dielectric layer constituting the multilayer ceramic capacitor shown in FIG. 1A.

FIG. 1A is a schematic perspective view of a multilayer ceramic capacitor according to an exemplary embodiment of the present invention. FIG. 1B is a cross-sectional view of the multilayer ceramic capacitor taken along line A-A' of FIG. 1A. FIG. 1C is an exploded perspective view of a multilayer body and first and second side members. FIG. 1D is a cross-sectional view of the multilayer ceramic capacitor taken along line B-B' of FIG. 1A. FIG. 1E is a top plan view of the multilayer ceramic capacitor showing one dielectric layer constituting the multilayer ceramic capacitor shown in FIG. 1A.

Referring to FIGS. 1A through 1E, the multilayer ceramic capacitor according to the exemplary embodiment of the present invention is configured to include a ceramic body 110, a plurality of inner electrodes 121 and 122 formed within the ceramic body, and outer electrodes 131 and 132 formed on outer surfaces of the ceramic body.

The ceramic body 110 may have a first side 1 and a second side 2 to be opposed to each other and a third side 3 and a fourth side 4 connecting the first side to the second side. The shape of the ceramic body 110 is not particularly limited, but it may be a rectangular parallelepiped shape having first to fourth sides as shown in FIG. 1.

According to the exemplary embodiment of the present invention, the multilayer body 111 may be formed by stacking a plurality of dielectric layers 112.

The plurality of dielectric layers 112 configuring the multilayer body 111, in a sintered state, may be integrated so that a boundary between the adjacent dielectric layers may not be readily apparent.

A length of the dielectric layer 112 forms a distance between the third side 3 and the fourth side of the multilayer body 111 and a width of the dielectric layer 112 forms a distance between the first side 1 and the second side of the multilayer body 111.

The plurality of inner electrodes 121 and 122 may be formed in the multilayer body 111. The inner electrodes 121 and 122 may be formed on the dielectric layer 112 and may be formed in the multilayer body 111 by sintering, having one dielectric layer therebetween.

The inner electrodes 121 and 122 may be formed on the dielectric layer and the inner electrodes 121 and 122 may be formed in the ceramic body by sintering, having one dielectric layer therebetween.

The inner electrodes 121 and 122 are a pair of a first inner electrode 121 and a second inner electrode 122 having different polarities and may be disposed to be opposed to each other in the stacking direction of the dielectric layer.

The distal edges of the first and second inner electrodes 121 and 122 are exposed to the first side 1 and the second side 2.

Referring to FIG. 1E, the first inner electrode 121 is formed on the dielectric layer 112.

The width of the first inner electrode 121 may be equal to width of the dielectric layer 112. That is, the first inner electrode 121 may be entirely formed in the width direction of the dielectric layer 112. In addition, the width of the second inner electrode may also be equal to the width of the dielectric layer. Therefore, all of the distal edges of the first and second inner electrodes may be exposed to the first and second sides.

The first inner electrode 121 and the second inner electrode 122 are not entirely formed in the longitudinal direction of the dielectric layer. That is, one end of the first inner electrode 121 may be formed up to the third side 3 to be exposed to the third side 3 and the other end of the first inner electrode 121 may be formed to be spaced apart by a predetermined distance d2 from the fourth side 4 of the ceramic body. The one end of the first inner electrode 121 exposed to the third side 3 of the multilayer body may be connected to the first outer electrode 131.

One end of the second inner electrode 122 may be exposed to the fourth side 4 to be connected to the second outer electrode 132 and the other end of the second inner electrode 122 may be formed to be spaced apart by a predetermined distance from the third side 3.

According to the exemplary embodiment of the present invention, although the inner electrodes and the dielectric layer are thinly formed, the inner electrodes are entirely formed across the width of the dielectric layer to increase the overlapping area between the inner electrodes, thereby increasing the capacity of the multilayer ceramic capacitor. In addition, the multilayer ceramic capacitor with excellent reliability while having the excellent capacity characteristics may be provided by reducing steps due to the inner electrodes so as to improve the lifespan of the insulation resistance.

In the exemplary embodiment of the present invention, the first and second sides of the multilayer body 111 to which the distal edges of the first and secodn inner electrodes are exposed may have the first side member 113 and the second side member 114 formed thereon.

The first and second side members 113 and 144 may be formed to cover the distal edges of the plurality of exposed first and second inner electrodes. Therefore, it is possible to prevent shorts between the inner electrodes and internal defects such as moisture resistance.

Referring to FIG. 1D, an angle θ, formed by a virtual line connecting the distal edges of the plurality of inner electrodes 121 and 122 exposed to the first and second sides and the first and second side members 113 and 114, may be set to be less than 90° (π/2). The angle θ may be measured at a point at which the virtual line connecting the distal edges of the plurality of inner electrodes meets the first and second side members.

More preferably, the angle θ that is formed by the virtual line connecting the distal edges of the plurality of inner electrodes and the first side member 113 or the second side member 114 may be 5° to 85°, more preferably 20 to 60°.

In addition, the first and second side members 113 and 114 may be formed to have a curvature radius.

Although not limited thereto, the characteristics of the above-mentioned first and second side members may be shown in an area in which the outer electrodes are not formed at the first and second sides of the multilayer body.

As shown, the first and second side members 113 and 114 may be formed on the entirety of the first and second sides of the multilayer body. All of the distal edges of the plurality of inner electrodes exposed to the first and second sides may be covered.

The distal edges of the first and second side members 113 and 114 may meet the edges at which the top surface and the bottom surface of the multilayer body meets the first side or the second side.

According to the exemplary embodiment of the present invention, the first side member 113 and the second side member 114 may be made of ceramic slurry. The widths (thickness) and shape of the first side member 113 and the second side member 114 may be controlled by controlling the amount and shape of ceramic slurry.

According to the exemplary embodiment of the present invention, the angle θ that is formed by the virtual line connecting the distal edges of the plurality of inner electrodes and the first side member or the second side member may be set to be less than 90° (π/2) without performing the polishing process.

According to the exemplary embodiment, the first side member and the second side member are formed to have the curvature radius and the edge portions at which it is relatively difficult to remove the residual carbon are formed to be very small, thereby easily remove the residual carbon. Therefore, the distribution of the residual carbon is small, such that the multilayer ceramic capacitor may maintain the same fine structure and improve the connectivity of the inner electrodes. In addition, the first and second side members have a predetermined thickness at the central portion of the multilayer ceramic capacitor, such that the moisture resistance characteristics are not degraded, internal defects do not occur, and the possible occurrence of radiating cracks may be reduced at the time of forming the outer electrodes.

Although not limited thereto, the maximum thickness d1 of the first and second side members may be 30 μm or less. In addition, the maximum thickness d1 may be 10 μm.

When the maximum thickness d1 exceeds 30 μm, it may be difficult to remove the residual carbon during the plasticizing and firing processes of the multilayer body, thereby degrading the connectivity of the inner electrodes. In addition, when the maximum thickness d1 exceeds 30 μm, it may difficult to secure the high-capacity multilayer ceramic capacitor by relatively reducing the overlapping area between the inner electrodes.

When the maximum thickness d1 is less than 10 μm, the moisture resistance characteristics of the multilayer ceramic capacitor may be degraded and radiating cracks may occur at the time of forming the outer electrodes. In addition, mechanical strength against external impacts may be degraded.

The exemplary embodiment of the present invention may allow for the manufacturing of the multilayer ceramic capacitor having excellent reliability by improving the moisture resistance and the insulation resistance characteristics of the multilayer ceramic capacitor while maximizing the capacity thereof.

Figure 2:
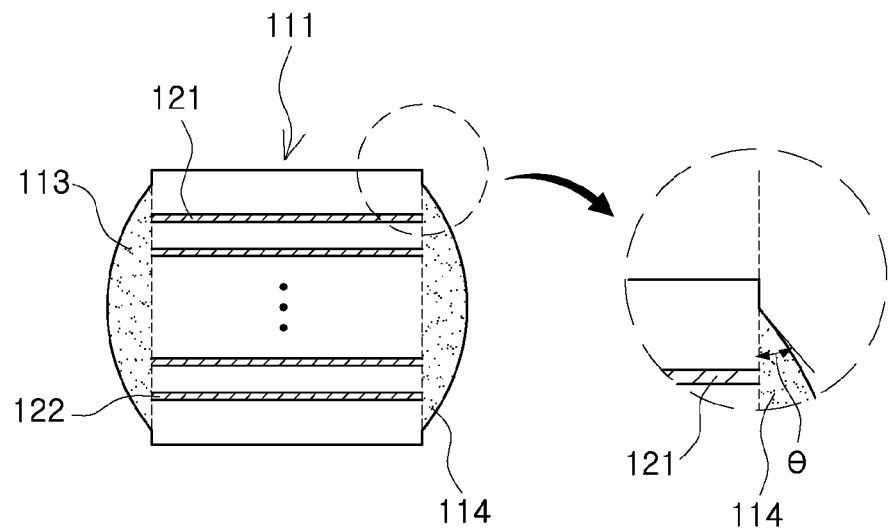
FIGS. 2 and 3 are cross-sectional views, respectively showing a multilayer ceramic capacitor according to another exemplary embodiment of the present invention.
Figure 3:
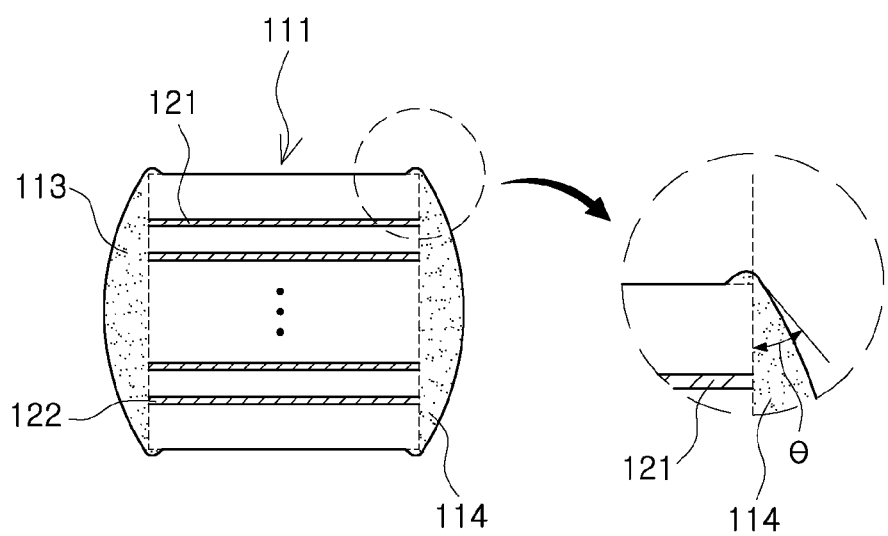

FIGS. 2 and 3 are cross-sectional views, respectively showing a multilayer ceramic capacitor according to another exemplary embodiment of the present invention. Herein, components different from those described in above-mentioned exemplary embodiments may be described and a detailed description of the same components will be omitted.

Referring to FIG. 2, an angle θ that is formed by the virtual line connecting the distal edges of the plurality of inner electrodes 121 and 122 exposed to the first and second sides and the first and second side members 113 and 114 may be set to be less than 90° ($\pi/2$). In addition, the first and second side members 113 and 114 may be formed in a portion of the area of the first side or the second side.

The distal edges of the first and second side members may be provided between the edges at which a top surface or a bottom surface of the multilayer body meets the first side or the second side and the distal edges of an outermost inner electrodes among the plurality of inner electrodes.

That is, a portion of the first and second sides of the multilayer body may be exposed.

Therefore, the removal of the residual carbon may be more easily performed at edges at which it is relatively difficult to remove the residual carbon.

Referring to FIG. 3, the first and second side members 113 and 114 may be formed to partially extend to the top surface or the bottom surface of the multilayer body from the first and second sides.

The angle θ that is formed by the virtual line connecting the distal edges of the plurality of inner electrodes 121 and 122 exposed to the first and second sides and the first and second side members 113 and 114 may be set to be less than $90\pi$ ($\pi/2$).

The first and second side members are formed to have a small thickness at edges where they meet the top surface or the bottom surface of the multilayer body, but partially extend to the top surface or the bottom surface of the multilayer body from the first and second sides, such that the radiating cracks may occur at the time of forming the outer electrodes and the mechanical strength against the external impact may be improved.

Hereinafter, a method of manufacturing a multilayer ceramic capacitor according to the exemplary embodiment of the present invention will be described below.

FIGS. 4A to 4F are cross-sectional views and perspective views schematically showing a method of manufacturing a multilayer ceramic capacitor according to an exemplary embodiment of the present invention.

Figure 4A:
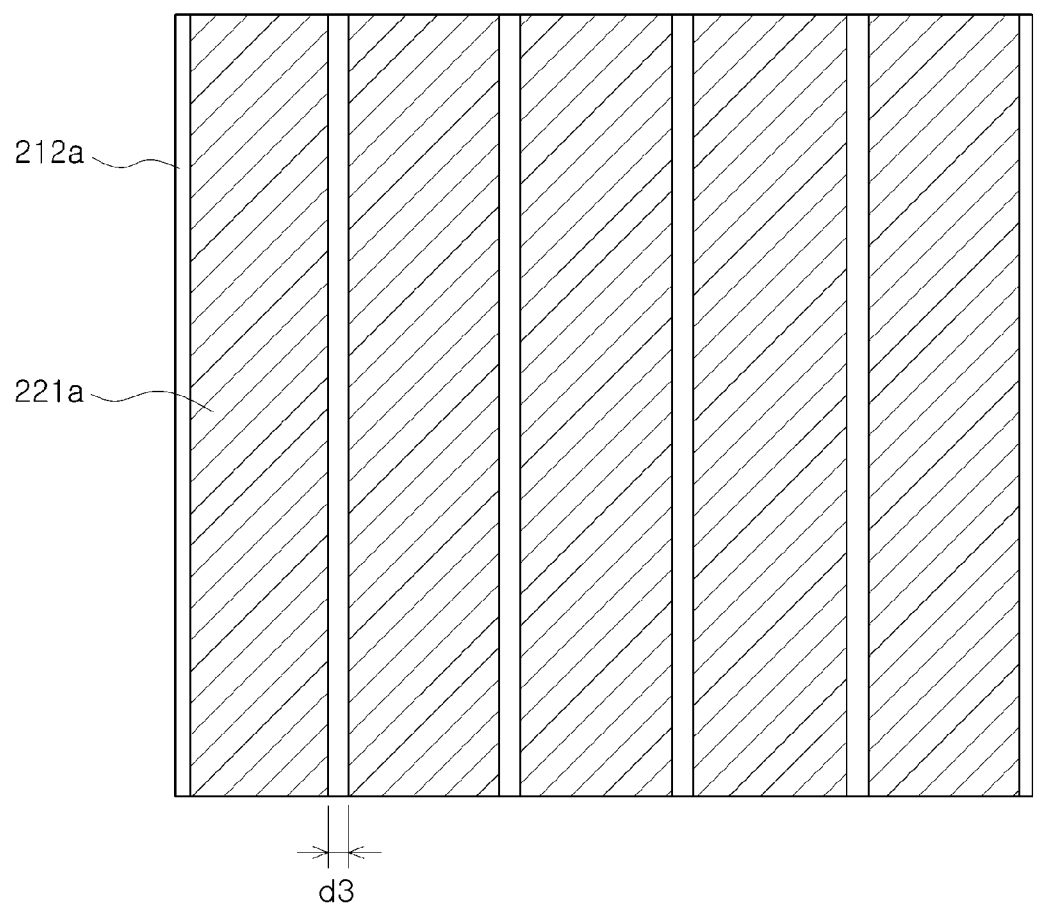
FIGS. 4A to 4F are cross-sectional views and perspective views schematically showing a method of manufacturing a multilayer ceramic capacitor according to an exemplary embodiment of the present invention.

First, as shown in FIG. 4A, a plurality of stripe-type first inner electrode patterns 221a may be formed on a ceramic green sheet 212a to be spaced apart from one another by a predetermined distance d3. The plurality of stripe-type first inner electrode patterns 221a may be formed in parallel with one another.

The predetermined distance d3 is a distance to allow the inner electrodes to be insulated from the outer electrodes having different polarities and may be considered as a distance of d2×2 shown in FIG. 1E.

The ceramic green sheet 212a may be made of ceramic paste including a ceramic powder, an organic solvent, and an organic binder.

The ceramic powder is a material having high permittivity, but is not limited thereto. A barium titanate ($BaTiO_3$) material, a lead complex Perovskite material, a strontium titanate ($SrTiO_3$) material, or the like, may be used, preferably, a barium titanate ($BaTiO_3$) powder may be used. When the ceramic green sheet 212a having the plurality of stripe-type first inner electrode patterns 221a formed thereon is fired, it may become a dielectric layer constituting the ceramic body.

The stripe-type first inner electrode patterns 221a may be made of the inner electrode paste including a conductive metal. The conductive metal is not limited thereto, but may be Ni, Cu, Pd, or an alloy thereof.

A method of forming the stripe-type first inner electrode pattern 221a on the ceramic green sheet 212a is not particularly limited, but may be formed by, for example, a printing method such as a screen printing method or a gravure printing method.

Further, although not shown, a plurality of stripe-type second inner electrode patterns 222a may be formed on another ceramic green sheet 212a to be spaced apart by a predetermined distance.

Hereinafter, the ceramic green sheet on which the first inner electrode patterns 221a are formed may be referred to as the first ceramic green sheet and the ceramic green sheet on which the second inner electrode patterns 222a are formed may be referred to as the second ceramic green sheet.

Figure 4B:
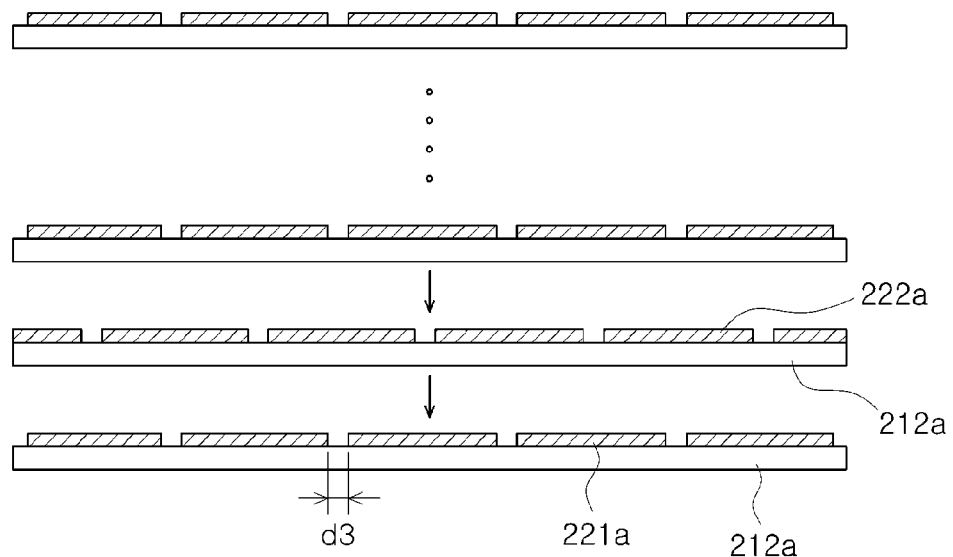

Next, as shown in FIG. 4B, the first and second ceramic green sheets may be alternately stacked such that the stripe-type first inner electrode patterns 221a and the stripe-type second inner electrode patterns 222a are alternately stacked.

Thereafter, each stripe-type first inner electrode pattern 221a may form the first inner electrode 221 and each stripe-type second inner electrode pattern 222a may form the second inner electrode 222.

Figure 4C:
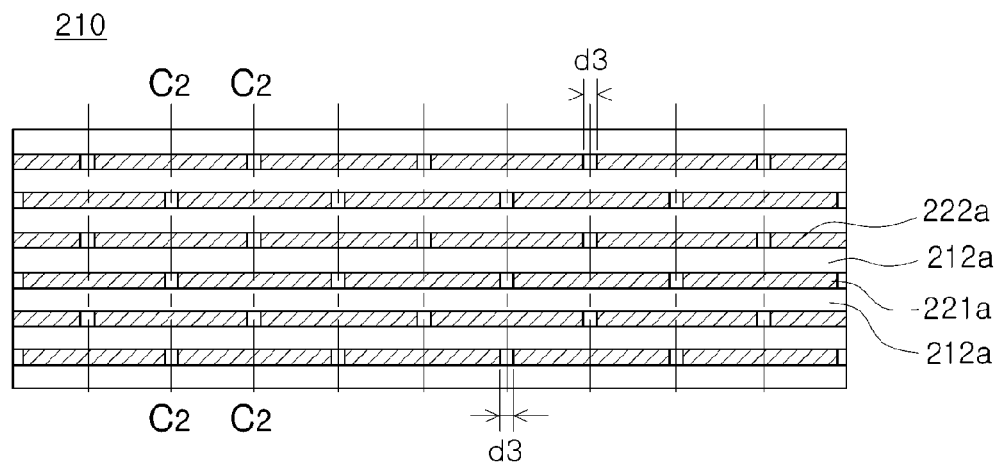
Figure 4D:
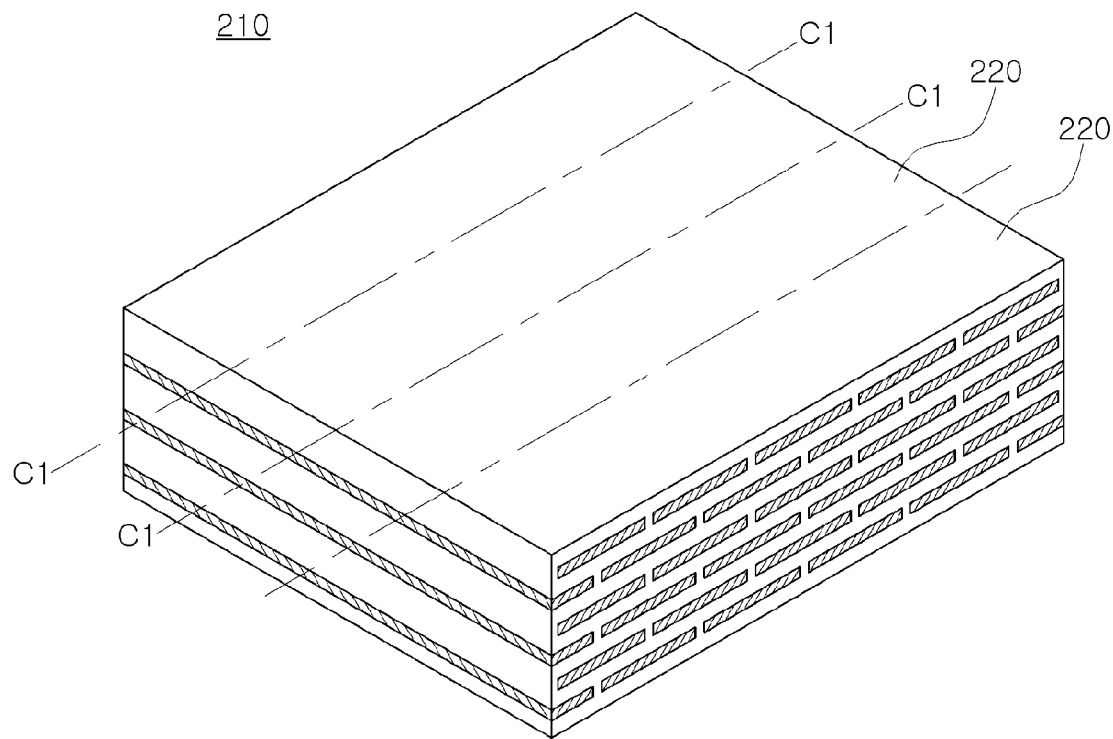

FIG. 4C is a cross-sectional view of a ceramic green sheet laminate 210 on which the first and second ceramic green sheets are stacked according to the exemplary embodiment of the present invention and FIG. 4D is a perspective view of the ceramic green sheet laminate 210 on which the first and second ceramic green sheets are stacked.

Referring to FIGS. 4C and 4D, the first ceramic green sheet on which the plurality of parallel stripe-type first inner electrode patterns 221a are printed and the second ceramic green sheet on which the plurality of parallel stripe-type second inner electrode patterns 222a are printed are alternately stacked.

In more detail, the first ceramic green sheet and the second ceramic green sheet are stacked in such a manner that the central portion of the stripe-type first inner electrode pattern 221a printed on the first ceramic green sheet and the distance d3 between the stripe-type second inner electrode patterns 222a printed on the second ceramic green sheet overlap with each other.

Next, as shown in FIG. 4D, the ceramic green sheet laminate 210 may be cut so as to traverse the plurality of stripe-type first inner electrode patterns 221a and the plurality of stripe-type second inner electrode patterns 222a. That is, the ceramic green sheet laminate 210 may be cut into bar-type laminates 220 along cutting line C1-C1.

In more detail, the stripe-type first inner electrode patterns 221a and the stripe-type second inner electrode patterns 222a may be cut in a longitudinal direction to be divided into a plurality of inner electrodes having a constant width. In this case, the stacked ceramic green sheets are cut together with the inner electrode patterns. As a result, dielectric layers having the same width as the width of the inner electrodes may be formed.

The distal edges of the first and second inner electrodes may be exposed to the cut surfaces of each of the bar-type laminates 220. The cut surfaces of the bar-type laminate 220 may each be referred to as the first side and the second side of the bar-type laminate.

Figure 4E:
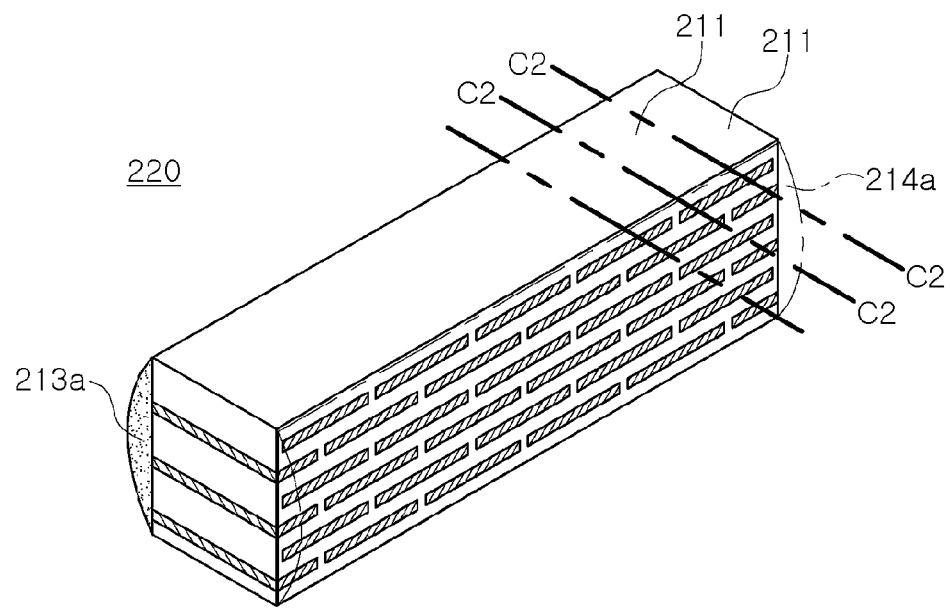

Next, as shown in FIG. 4E, the first side and second sides of the bar-type laminate 220 may each be provided with a first side member 213a and a second side member 214a. The second side member 214a is not clearly shown and the contour thereof is shown as a dotted line.

The first and second sides of the bar-type laminate 220 may be considered to correspond to the first side and the second side of the multilayer body 111 shown in FIG. 1C.

The first and second side members 213a and 214a may be made of ceramic slurry including a ceramic powder in the bar-type laminate 220. The ceramic slurry may include a ceramic powder, an organic binder, and an organic solvent.

The first and second side members 213a and 214a may be formed such that the angle $\theta$ formed by the virtual line connecting the distal edges of the first inner electrode and the second inner electrode exposed to the first and second sides of the bar-type laminate is less than 90° ($\pi/2$). More preferably, the angle $\theta$ formed by the virtual line connecting the distal edges the plurality of inner electrodes and the first and second side members 213a and 214a may be set to be 5° to 85°. In addition, the first and second side members 213a and 214a may be formed to have a curvature radius.

The amount of the ceramic slurry may be controlled such that the first and second side members 213a and 214a have the desired thickness (or width). In addition, various shapes of the first and second side members may be formed by controlling the shape of the ceramic slurry and the formation position of the ceramic slurry.

The first and second side members 213a and 214a may be formed by applying the ceramic slurry to the first and second sides of the bar-type laminate 220. A method of applying the ceramic slurry is not particularly limited and therefore, the ceramic slurry may be sprayed by a spray method or may be applied using a roller.

In addition, the ceramic slurry may be formed over the entirety of the first and second sides of the bar-type laminate 220 or may be formed on only a portion thereof. In addition, the ceramic slurry may be applied by being extended from the first and second sides of the bar-type laminate to a portion of the top surface or the bottom surface.

In addition, the first and second sides of the bar-type laminate may be dipped in the ceramic slurry to have the first and second side members 213a and 214a formed thereon.

The desired shape of the first and second side members may be formed by polishing the shape of the ceramic slurry formed on the first and second sides of the bar-type laminate.

Figure 4F:
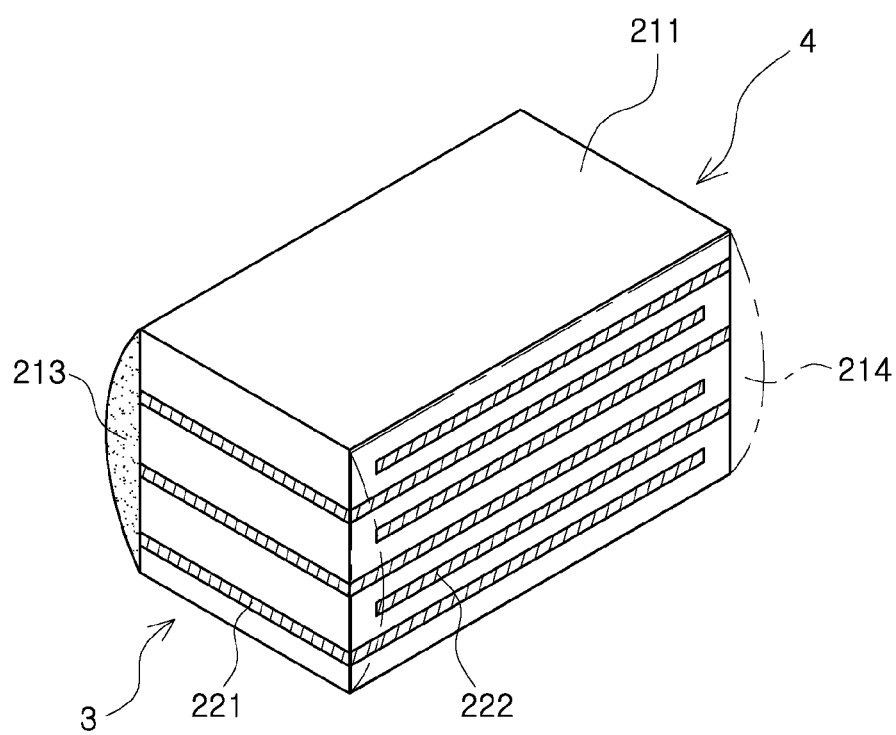

Next, as shown in FIGS. 4E and 4F, the bar-type laminate 220 provided with the first and second side members 213a and 214a may be cut along cutting line C2-C2 to correspond to the individual chip size. FIG. 4C may be referenced to determine a position of cutting line C2-C2.

The bar-type laminate 220 is cut into chip sized fragments, thereby forming a multilayer body 211 having first and second side members 213 and 214 formed thereon.

In greater detail, As the bar-type laminate 220 is cut along cutting line C2-C2, the overlapped central portion of the first inner electrode and the predetermined distance d3 formed between the second inner electrodes may be cut along the same cutting line, that is, line C2-C2. Alternatively, the central portion of the second inner electrode and a predetermined distance between the first inner electrodes may be cut along the same cutting line.

Therefore, one ends of the first inner electrode and the second inner electrode may be alternately exposed to cut surfaces along cutting line C2-C2. The surface to which the first inner electrode 221 is exposed may be considered to be the third side 3 of the multilayer body shown in FIG. 1A and the surface to which the second inner electrode 222 is exposed may be considered to be the fourth side 4 of the multilayer body shown in FIG. 1A.

As the bar-type laminate 220 is cut along cutting line C2-C2, the predetermined distance d3 between the stripe-type first inner electrode patterns 221a is cut half, whereby one end of the first inner electrode 221 may form the predetermined distance d2 from the fourth side. In addition, the second inner electrode 222 may form a predetermined distance from the third side.

Thereafter, the multilayer body 211 of which both sides are provided with the first and second side members 213 and 214 may be plasticized and fired.

As described above, the first and second side members may be formed to have the predetermined angle $\theta$ and the curvature radius with respect to the first and second sides by controlling the amount and shape of the ceramic slurry. The desired shape of the side members may be obtained without performing the separate polishing process after the firing process. Therefore, it is possible to prevent chipping which may occur during the polishing process.

Next, although not shown, the third side and the fourth side may each be provided with the outer electrodes to be connected to one end of the first and second inner electrodes.

In addition, the first and second side members may be plasticized and fired after being formed on both sides of the bar-type laminate and then the bar-type laminate may be cut into multilayer body shapes. Thereafter, a process of forming outer electrodes on the multilayer body may be performed.

According to the exemplary embodiment of the present invention, when the bar-type laminate 220 has the first and second side members formed thereon and then is cut into chip sized fragments, a plurality of the multilayer bodies 111 may have the side members formed thereon by one-time process.

In addition, although not shown, before forming the first side member and the second side member, the bar-type laminate may be cut into chip sized fragments to form the plurality of multilayer bodies.

That is, the bar-type laminate may be cut in such a manner that the central portion of the first inner electrode and the predetermined distance formed between the second inner electrodes that overlap with each other are cut along the same cutting line. Therefore, one ends of the first inner electrodes and the second inner electrodes may be alternately exposed to the cut surface.

Thereafter, the first and second sides of the multilayer body may have the first side member and the second side member formed thereon. The method of forming the first and second side members will be described above. The multilayer body having the first side member and the second side member formed thereon may be plasticized and fired.

Thereafter, the third side of the multilayer body to which the first inner electrode is exposed and the fourth side of the multilayer body to which the second inner electrode is exposed may each have the outer electrodes formed thereon.

According to the exemplary embodiment of the present invention, the edge portions at which it is relatively difficult to remove the residual carbon may be formed to have a small thickness by the ceramic slurry. Therefore, it may be facilated to remove the residual carbon during the plasticizing and firing processes of the multilayer body.

In addition, the desired shape of side members may be obtained without performing the separate polishing process after the firing process. Therefore, it is possible to prevent chipping which may occur during the polishing process.

In addition, the width of the side members disposed at the central portion of the multilayer ceramic capacitor is formed to have a predetermined thickness to secure moisture resistance characteristics, such that the internal defects may not occur. Further, the occurrence of radiating cracks at the time of forming the outer electrodes may be prevented and mechanical strength against external impacts may be secured.

Further, the inner electrode may be entirely formed in the width direction of the dielectric layer, excepting the minimum area necessary to maintain the insulation from the outer electrode having different polarities. Therefore, the overlapping area between the inner electrodes may be expanded and the occurrence of the step due to the inner electrode may be reduced.

As set forth above, the exemplary embodiment of the present invention reduces the thickness of the edge portions at which it is difficult to remove the residual carbon, thereby facilitating the removal of the residual carbon. Therefore, the concentration distribution of the residual carbon is small, such that the multilayer ceramic capacitor may maintain the same fine structure and improve the connectivity of the inner electrodes.

In addition, the first and second side members have a predetermined thickness at the central portion of the multilayer ceramic capacitor, such that moisture resistance characteristics are not degraded, internal defects do not occur, the possible occurrence of radiating cracks may be reduced at the time of forming the outer electrodes, while mechanical strength against external impact may be secured.

Further, the exemplary embodiment of the present invention may control the amount and shape of the ceramic slurry to form various shapes of the first and second side members.

The desired shape of the side members may be obtained without performing the separate polishing process after the firing process. Therefore, it is possible to prevent chipping which may occur during the polishing process.

Further, the inner electrode may be entirely formed in the width direction of the dielectric layer, excepting for the minimum area necessary to maintain insulation from the outer electrode having different polarities. Therefore, the overlapping area between the inner electrodes may be expanded and the occurrence of steps due to the inner electrode may be reduced.

While the present invention has been shown and described in connection with the exemplary embodiments, it will be apparent to those skilled in the art that modification and variation can be made without departing from the spirit and scope of the invention as defined by the appended claims.

What is claimed is:

1. A multilayer ceramic capacitor, comprising:
a multilayer body having a first side and a second side opposite to each other and having a third side and a fourth side connecting the first side to the second side;
a plurality of inner electrodes formed in the multilayer body and having distal edges exposed to the first side or the second side;
first and second side members formed on the first and second sides of the multilayer body to cover the exposed distal edges of the inner electrodes, a maximum thickness of the first and second side members being more than 10 μm and 30 μm or less, an angle (θ) between a virtual line connecting the distal edges of the plurality of inner electrodes and the first side member or the second side member being less than 90° (π/2); and
outer electrodes formed on the third side and the fourth side to be electrically connected to the inner electrodes.

2. The multilayer ceramic capacitor of claim 1, wherein the angle between the virtual line connecting the distal edges of the plurality of inner electrodes and the first side member or the second side member is 5° to 85°.

3. The multilayer ceramic capacitor of claim 1, wherein the first and second side members are formed on a partial area of the first side or the second side.

4. The multilayer ceramic capacitor of claim 1, wherein the first and second side, wherein the first and second side members are formed to partially extend from the first and second sides to the top surface or the bottom surface of the multilayer body.

5. The multilayer ceramic capacitor of claim 1, wherein the first and second side members are formed to have a curvature radius.

6. The multilayer ceramic capacitor of claim 1, wherein the multilayer body is formed by stacking a plurality of dielectric layers having a width forming a distance between the first and second sides, and the inner electrodes have a width the same as the width of the dielectric layer.

7. The multilayer ceramic capacitor of claim 1, wherein the first and second side members are made of ceramic slurry.

8. The multilayer ceramic capacitor of claim 1, wherein the inner electrodes include a first inner electrode of which one end is exposed to the third side and the other end is formed to be spaced apart from the fourth side by a predetermined distance and a second inner electrode of which one end is exposed to the fourth side and the other end is formed to be spaced apart from the third side by a predetermined distance.

9. The multilayer ceramic capacitor of claim 1, wherein the first and second side members are formed on the entirety of the first side or the second side.

10. The multilayer ceramic capacitor of claim 1, wherein distal edges of the first and second side member meet edges at which a top surface or a bottom surface of the multilayer body meets the first side or the second side thereof.

11. The multilayer ceramic capacitor of claim 1, wherein distal edges of the first and second side members is provided between edges at which a top surface or a bottom surface of the multilayer body meets the first side or the second side and distal edges of an outermost inner electrodes among the plurality of inner electrodes.

12. A multilayer ceramic capacitor, comprising:
a multilayer body including a plurality of inner electrodes, the multilayer body having a first side and a second side opposite to each other and having a third side and a fourth side connecting the first side to the second side;
first and second side members formed on the first and second sides of the multilayer body and having round edges, the first and second side members being in contact with distal edges of the inner electrodes, a maximum thickness of the first and second side members being more than 10 µm and 30 µm or less; and outer electrodes formed on the third side and the fourth side to be electrically connected to the inner electrodes.

13. A method of manufacturing a multilayer ceramic capacitor, comprising:

preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance;

forming a ceramic green sheet laminate by alternately stacking the first ceramic green sheet and the second ceramic green sheet in such a manner that a central portion of each of the stripe-type first inner electrode patterns and a predetermined distance between the stripe-type second inner electrode patterns overlap with each other;

cutting a ceramic green sheet laminate to traverse the stripe-type first inner electrode patterns and second inner electrode patterns, to allow first inner electrodes and second inner electrodes to have a predetermined width, and to allow the ceramic green sheet laminate to have sides to which distal edges of the first inner electrodes and the second inner electrodes are exposed in a width direction thereof; and forming a first side member and a second side member made of ceramic slurry on the sides to which the distal edges of the first and second inner electrodes are exposed, so that an angle θ between a virtual line connecting the distal edges of the first inner electrodes and the second inner electrodes is set to be less than 90° (π/2), wherein a maximum thickness of the first and second side members is more than 10 µm and 30 m or less.

14. The method of claim 13, wherein the cutting of the ceramic green sheet laminate includes:

cutting the ceramic green sheet laminate into bar-type laminates, each bar-type laminate having sides to which the distal edges of the first inner electrodes and the second inner electrodes are exposed, and after the forming of the first and second side members, cutting the ceramic green sheet into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line.

15. The method of claim 13, wherein the cutting of the ceramic green sheet laminate is performed by cutting the ceramic green sheet into bar-type laminates, each bar-type laminate having sides to which the distal edges of the first inner electrodes and the second inner electrodes are exposed, and cutting the bar-type laminate into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line; and the forming of the first and second side members is performed on the multilayer body.

16. The method of claim 13, wherein the first and second side members are formed on a partial area of the sides to which the distal edges of the first and second inner electrodes are exposed.

17. The method of claim 13, wherein the first and second side members are formed to have a curvature radius.

18. The method of claim 13, wherein the forming of the first side member and the second side member is performed by applying ceramic slurry to the sides to which the distal edges of the first inner electrodes and the second inner electrodes are exposed.

19. The method of claim 13, wherein the forming of the first side member and the second side member is performed by dipping the sides to which the distal edges of the first inner electrodes and the second inner electrodes are exposed in the ceramic slurry.

20. The method of claim 13, wherein the first and second side members are formed on the entirety of the sides to which the distal edges of the first and second inner electrodes are exposed.

21. A method of manufacturing a multilayer ceramic capacitor, comprising:

preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance;

forming a ceramic green sheet laminate by alternately stacking the first ceramic green sheet and the second ceramic green sheet in such a manner that a central portion of each of the stripe-type first inner electrode patterns and a predetermined distance between the stripe-type second inner electrode patterns overlap with each other;

cutting a ceramic green sheet laminate to traverse the stripe-type first inner electrode patterns and second inner electrode patterns, to allow first inner electrodes and second inner electrodes to have a predetermined width, and to allow the ceramic green sheet laminate to have sides to which distal edges of the first inner electrodes and the second inner electrodes are exposed in a width direction thereof; and forming a first side member and a second side member made of ceramic slurry on the sides to which the distal edges of the first and second inner electrodes are exposed, so that an angle θ between a virtual line connecting the distal edges of the first inner electrodes and the second inner electrodes is set to be less than 90° (π/2), wherein a maximum thickness of the first and second side members is more than 10 µm and 30 µm or less, and wherein the first and second side members are formed to partially extend from the sides to which the distal edges of the first and second inner electrodes are exposed to a top surface or a bottom surface of the ceramic green sheet laminate.

* * * * *